(12) United States Patent
Schlattmann et al.

(10) Patent No.: US 12,123,501 B2
(45) Date of Patent: Oct. 22, 2024

(54) DEVICE FOR CONTROLLING A FLOW AND DISTRIBUTING A FLUID IN A FLUID CIRCUIT

(71) Applicant: Hanon Systems, Daejeon (KR)

(72) Inventors: Nils Michael Schlattmann, Cologne (DE); Björn Bergmann, Sankt Augustin (DE); Daniel Zens, Kreuzau (DE); Deny Laforge, Kerpen (DE); Jerome Görres, Cologne (DE); Dominik Wiechard, Cologne (DE); Johannes Müller, Neuss (DE)

(73) Assignee: HANON SYSTEMS, Daejeon (KR)

( * ) Notice: Subject to any disclaimer, the term of this patent is extended or adjusted under 35 U.S.C. 154(b) by 157 days.

(21) Appl. No.: 17/756,693

(22) PCT Filed: Jan. 15, 2021

(86) PCT No.: PCT/KR2021/000583
§ 371 (c)(1),
(2) Date: May 31, 2022

(87) PCT Pub. No.: WO2021/145717
PCT Pub. Date: Jul. 22, 2021

(65) Prior Publication Data
US 2022/0412470 A1 Dec. 29, 2022

(30) Foreign Application Priority Data
Jan. 17, 2020 (DE) ..................... 10 2020 101 030.3

(51) Int. Cl.
*F16K 11/065* (2006.01)
*F25B 41/34* (2021.01)

(52) U.S. Cl.
CPC ............ *F16K 11/065* (2013.01); *F25B 41/34* (2021.01); *Y10T 137/2605* (2015.04); *Y10T 137/86702* (2015.04)

(58) Field of Classification Search
CPC .... F16K 11/07; F16K 11/065; F16K 11/0716; Y10T 137/86702; Y10T 137/2605; F25B 41/34
See application file for complete search history.

(56) References Cited

U.S. PATENT DOCUMENTS

| 4,406,305 A * | 9/1983 | Brunner | F15B 13/08 |
| | | | 137/625.68 |
| 2012/0097278 A1 * | 4/2012 | Schamann | B29C 48/467 |
| | | | 137/625.48 |

(Continued)

FOREIGN PATENT DOCUMENTS

| DE | 102013206626 A1 | 10/2014 |
| DE | 102016013492 A1 | 5/2018 |

(Continued)

OTHER PUBLICATIONS

English language machine translation of KR10-1159281 retrieved from espacenet.com Feb. 2024 (Year: 2024).*
JP58008876A (Year: 1981).*

*Primary Examiner* — Jessica Cahill
(74) *Attorney, Agent, or Firm* — Shumaker, Loop & Kendrick, LLP; James D. Miller

(57) ABSTRACT

A device for controlling a flow and distributing a fluid, in particular a refrigerant, in a fluid circuit. The device exhibits a housing with connections for connection to fluid lines that are connected to one internal volume of the housing via a pass-through opening, and one valve element that is arranged in the internal volume of the housing and exhibits a drive element for moving the valve element relative to the housing. The valve element exhibits one pass-through open- (Continued)

ing and is mounted in such a way that it can be moved linearly in the axial direction along a longitudinal axis such that a passage for the fluid is opened between a first connection produced as an inlet and a second connection produced as a primary outlet or a third connection produced as a secondary outlet.

20 Claims, 2 Drawing Sheets

(56) References Cited

U.S. PATENT DOCUMENTS

| | | | |
|---|---|---|---|
| 2012/0145252 A1* | 6/2012 | Hunnicutt | F16K 31/426 137/625.69 |
| 2014/0069102 A1* | 3/2014 | Satienpoch | F16K 11/07 60/734 |
| 2014/0166139 A1* | 6/2014 | Watanabe | F16K 11/04 137/625.35 |
| 2015/0198241 A1* | 7/2015 | Barngrover | F16H 61/0251 137/625.65 |
| 2015/0233480 A1* | 8/2015 | Rateike | F16K 3/24 137/549 |
| 2017/0268681 A1* | 9/2017 | Bielen | F16K 27/041 |
| 2018/0245700 A1* | 8/2018 | Okamura | F15B 13/025 |
| 2020/0263675 A1* | 8/2020 | Miura | F04B 1/20 |

FOREIGN PATENT DOCUMENTS

| | | |
|---|---|---|
| JP | 2013181566 A | 9/2013 |
| KR | 101159281 B1 | 6/2012 |
| KR | 20180053239 A | 5/2018 |
| KR | 102045007 B1 | 11/2019 |

* cited by examiner

DEVICE FOR CONTROLLING A FLOW AND DISTRIBUTING A FLUID IN A FLUID CIRCUIT

CROSS REFERENCE TO RELATED APPLICATIONS

This is a U.S. national phase patent application of PCT/KR2021/000583 filed Jan. 15, 2021 which claims the benefit of and priority to German Pat. Appl. No. 10 2020 101 030.3 filed on Jan. 17, 2020, the entire contents of each of which are incorporated herein by reference.

TECHNICAL FIELD

The invention relates to a device for controlling a flow and distributing a fluid, in particular a refrigerant, in a fluid circuit, in particular a refrigerant circuit. The device exhibits a housing with connections for connection to fluid lines that are connected to an internal volume of the housing via a pass-through opening, and one valve element that is arranged in the internal volume of the housing and exhibits a drive element for moving the valve element relative to the housing.

BACKGROUND ART

The high demands placed on the comfort of the passengers in the passenger compartment are met in motor vehicles known from prior art by way of air-conditioning systems with different circuits for refrigerant and coolant with differently operated heat exchangers.

In addition, conventional motor vehicles propelled by an electric motor, briefly called electric vehicles, or motor vehicles with hybrid drive consisting of both an electric motor and a combustion engine, briefly called hybrid vehicles, in most cases exhibit higher supply needs in cold or heat than motor vehicles that are propelled exclusively by a combustion engine, which is due to their formation with additional components of the electric powertrain, such as high-voltage battery, internal charging unit, transformer, inverter, and electric motor. In addition to the refrigerant circuit of the air-conditioning system itself, motor vehicles that are known from prior art are produced with a pure electric drive or an electric hybrid drive with coolant circuit into which the coolant that circulates to discharge the heat emitted by the drive components is supplied through a coolant-refrigerant heat exchanger to be able to transfer the heat that is produced by the coolant into the refrigerant that circulates in the refrigerant circuit.

Thermal systems of electrically propelled motor vehicles exhibit a significant influence on the range of motor vehicles due to the required energy demand.

For example, a distribution of heat flows in motor vehicles in line with the demands by way of different subsystems facilitates faster air conditioning of components that require an optimum operating temperature. In battery electric vehicles (BEV) and vehicles with hybrid drive in which, in addition to the air conditioning of the passenger compartment, the air conditioning of the high-voltage components of the electric powertrain, for example, is also of special interest, the influence of the operation of the thermal systems on the range of motor vehicles must be minimized.

Furthermore, it is known from prior art to produce refrigerant circuits of air-conditioning systems in such a way that they can be operated both in heat pump mode and in refrigeration system mode in order to distribute thermal energies inside the motor vehicle. For example, in particular when operating the refrigerant circuit in heat pump mode, heat can be absorbed from the ambient air or a coolant circuit which can subsequently be transferred either to components of the motor vehicle with heat requirements or to the supply air to the passenger compartment. When operating the refrigerant circuit in refrigeration system mode, either heat can be absorbed from the passenger compartment or other components and transferred to the environment, for example, wherein the heat transfer media circuits, such as refrigerant circuits and coolant circuits, are connected both with each other inside the thermal system and with further components of the motor vehicle. Especially in the case of hybrid electric vehicles (HEV), there are great challenges for arranging the thermal system for air-conditioning of different components in the existing mounting space.

DE 10 2013 206 626 A1 suggests a refrigerant circuit for air conditioning of a vehicle. The refrigerant circuit exhibits a compressor and several heat exchangers operated as evaporators or condensers for transfer of the heat with the refrigerant, wherein the refrigerant circuit is produced with at least three evaporators and two condensers, wherein one expansion valve each for expansion of the refrigerant is connected upstream each evaporator, and one non-return valve each is arranged downstream each condenser in order to avoid relocation of refrigerant inside the refrigerant circuit. The components of the refrigerant circuit, in particular the large number of valves, are connected to one another in the refrigerant circuit via connecting pipes.

Since each valve is produced for performing one function only, a great number of valves and connecting pipes is required for providing the variety of functionalities, wherein each valve exhibits an actuator and is to be connected to a control unit, which results in high system complexity. In addition to high costs, this also results in high weight of the refrigerant circuit. Furthermore, much mounting space is required.

It is not known from prior art that several valves of a fluid circuit, in particular a refrigerant circuit, are produced and connected to each other internally and thus in a common housing to perform several functions, wherein conventional 3/2-way valves also perform only a blocking function.

Furthermore, in particular in refrigerant circuits with carbon dioxide as the refrigerant, much force is required for switching the valve between the functions at differential pressures of up to 100 bar.

DE 10 2016 013 492 A1 describes an expansion and shut-off valve, in particular an electrically driven expansion and shut-off valve for operation with carbon dioxide as the refrigerant, which exhibits a valve body that is arranged in a valve body chamber, exhibits a gasket seat and a gasket that are all arranged in the valve along an axial direction of movement of the valve body. In a closed state of the valve, the diameters of the valve body on positions of the gasket seat and the gasket, which is produced as a needle, correspond to the corresponding gasket diameters. Furthermore, a pressure bypass is opened between a media connection and the valve body chamber in the closed state of the valve.

The valve exhibits two media connections, wherein one flow cross-section of the connection can be opened or closed relative to each other; the flow cross-section of the connection can be opened either completely or only partially. When the valve is operated with partially opened flow cross-section, the refrigerant is expanded when flowing through the valve.

SUMMARY

The task of the invention is to provide a device for controlling a flow and distributing a fluid in a refrigerant circuit of a thermal system, in particular a thermal management system of a motor vehicle. The device is intended to combine functionalities, in particular those of valves, in such a way that, in addition to the complexity of the system, the costs, weight, and mounting space are minimized. In addition, it must be possible to operate the device easily, in particular with little expenditure of force, when used in circuits with carbon dioxide as a circulating fluid.

The task of the invention is solved by way of the objects with the features as shown and described herein.

The task is solved by way of a device for controlling a flow and distributing a fluid, in particular a refrigerant, in at least one fluid circuit, in particular a refrigerant circuit. The device exhibits a housing with connections for connection to fluid lines that are connected to at least one internal volume of the housing via a pass-through opening, and at least one valve element that is arranged in the internal volume of the housing and exhibits a drive element for moving the valve element relative to the housing.

According to the concept of the invention, the at least one valve element exhibits at least one pass-through opening and is mounted in such a way that it can be moved linearly in the axial direction along a longitudinal axis such that a passage for the fluid is opened between a first connection produced as an inlet and a second connection produced as a primary outlet or between the first connection produced as an inlet and a third connection produced as a secondary outlet. The valve element can also be arranged in such a way that no passage is opened between the inlet and one of the outlets or the pass-through opening of the valve element is closed.

Furthermore, according to the invention, the device exhibits at least one first pressure chamber and one second pressure chamber that are each produced on an end face of the valve element, which are aligned in the axial direction, as an area of the internal volume of the housing. The pressure chambers serve preferably for pressure equalization in order to reduce the motion energy or the force required to move the valve element.

The valve element is produced preferably in the form of a cylinder, in particular cuboidal, that is aligned in the axial direction. A cuboid in this context is to be understood as a prism with rectangular base, wherein the prism results from parallel shift of the rectangular base along a straight line protruding from the plane. The straight line can be aligned vertically to the plane of the base.

According to a preferred embodiment of the invention, lateral surfaces of the valve element and of the housing that produces the internal volume are each arranged parallel to each other, in particular in pairs, wherein one slot each for moving the valve element relative to the housing inside the internal volume of the housing is produced between the lateral surfaces that face each other.

According to a further embodiment of the invention, the end faces of the valve element and end faces of the housing that produces the internal volume are arranged in such a way that they face each other, in particular parallel to each other, wherein the first pressure chamber is produced between first end faces of the housing and of the valve element, and the second pressure chamber between second end faces of the housing and of the valve element.

According to an advantageous embodiment of the invention, at least one of the pressure chambers is connected fluidically with the pass-through opening of the first connection of the housing, and the pressure chambers are connected to one another fluidically via a connection channel, wherein the connection channel is produced preferably inside a wall, in particular a lateral wall, of the housing, or inside the valve element. If the connection channel is produced inside the valve element, the connection channel extends between the end faces of the valve element.

The pass-through opening of the valve element and the connection channel are connected to one another fluidically, preferably producing a common volume.

A further advantage of the invention is that the first connection is produced on a first lateral surface, in particular a first longitudinal side, of the housing, and the second connection, as well as the third connection on a second lateral surface, in particular a second longitudinal side, of the housing, wherein the second lateral surface is arranged preferably opposite the first lateral surface.

The symmetry axes of the pass-through openings of the connections are aligned preferably parallel to each other. The flow cross-sections of the pass-through openings of the connections of the housing exhibit preferably a circular form. The flow cross-sections of the pass-through openings are produced preferably with equal diameters that can be constant over the length.

According to a further preferred embodiment of the invention, the pass-through opening of the valve element extends through the valve element from a first lateral surface, in particular a first longitudinal side, of the valve element towards a second lateral surface, in particular a second longitudinal side, of the valve element, wherein the second lateral surface is arranged preferably opposite the first lateral surface. The first lateral surface is aligned preferably in the direction of the first connection of the housing, whereas the second lateral surface is aligned in the direction of the second connection or the third connection of the housing.

The flow cross-section of the pass-through opening of the valve element exhibits in particular an essentially circular form. The diameter of the flow cross-section of the pass-through opening can be constant over the length and can correspond to the diameter of the circular flow cross-sections of the pass-through openings of the connections of the housing.

The valve element with the at least one pass-through opening is produced preferably in such a way that the fluid can be expanded when flowing out of the pass-through opening, depending on the position of the valve element. Thus the device represents preferably a combination of two valves, in particular of two shut-off valves, each with an expansion function, and consequently a combination of two shut-off valves and two expansion valves, wherein the fluid, specifically the refrigerant, is routed from the inlet to the primary or secondary outlet and can be expanded into the opened flow path.

A further advantage of the invention is that at least one groove is produced on the surface of the valve element, starting from a margin of the pass-through opening, which extends in the radial direction to the outside, wherein a flow cross-section of the groove of the pass-through opening can be produced in such a way that it is tapered in the outward radial direction or with constant width.

According to an advantageous embodiment of the invention, the at least one valve element is connected to a drive element, that is arranged outside the housing, by way of a connecting element.

The connecting element is produced preferably as a shaft, wherein the connecting element is arranged in such a way that one first end is firmly connected to the drive element and one second end, that is produced distally towards the first end, protrudes through one side into the housing and is connected to the valve element.

The drive element can be produced either as a linear motor or as a rotary motor with a transfer arrangement, in particular a thread. The transfer arrangement serves to transfer a rotary movement of the connecting element around its longitudinal axis into a translatory lifting movement of the valve element, wherein the translatory lifting movement corresponds to a linear movement.

A drive element intended as a rotary motor is produced preferably as an electrical actuator, in particular as a stepper motor or servomotor, that allows preferably checking the angular position, for example. The motor can be produced with a sensor for determination of the position. The position of rotation of the connecting element which is determined by the sensor can be transmitted continuously to an electronic closed-loop control unit that controls the motion of the motor in accordance with settable setpoints, such as the angular setpoint positions of the connecting element, in a closed-loop control circuit.

The device according to the invention is produced as a highly integrated component, specifically as a refrigerant valve, for performing several functions. A large number of individual valves is summarized in the device.

The advantageous embodiment of the invention allows the use of the device for controlling a flow and distributing a fluid in a refrigerant circuit of a thermal system, in particular a thermal management system, of a motor vehicle, for example for conditioning an air mass flow that is to be supplied to a passenger compartment or to a component of a powertrain. Then the device also serves as an adaptive multiport refrigerant valve for motor vehicle air conditioning.

The refrigerant circuit in which a device is used can be operated with any refrigerant, in particular R1234yf, R1234a, R134a, R744, R404a, R600 or R600a, R290, R152a, R32, as well as with their mixtures.

In summary, the device according to the invention which is produced preferably as a 3-way 2-position slide valve with expansion function for the refrigerant 'carbon dioxide', in particular as a highly variable refrigerant valve with a great number of possible flow paths for the refrigerant, exhibits various advantages:

Combination of different functionalities, in particular of valves, specifically with an expansion function, in a 3-way 2-position valve;

The reduction of complexity during the assembly results in easier controlling and reduced error and failure probability, which reduces the warranty costs to be expected.

Ease of operation also thanks to reduced actuating force for moving the valve element;

Minimized weight, also since only one actuator is required, and no connecting pipes are required;

Reduction of refrigerant leaks to a minimum owing to the fact that no connecting pipes and sealing points are required, resulting in reduced costs for the end customer if servicing is required;

Minimal manufacturing, maintenance and operating costs, as well as a minimum of required mounting space.

BRIEF DESCRIPTION OF DRAWINGS

Further details, features, and advantages of embodiments of the invention result from the following description of examples of embodiment with reference to the corresponding drawings. The illustrations show the following.

DESCRIPTION OF AN EMBODIMENT

Figure 1A:
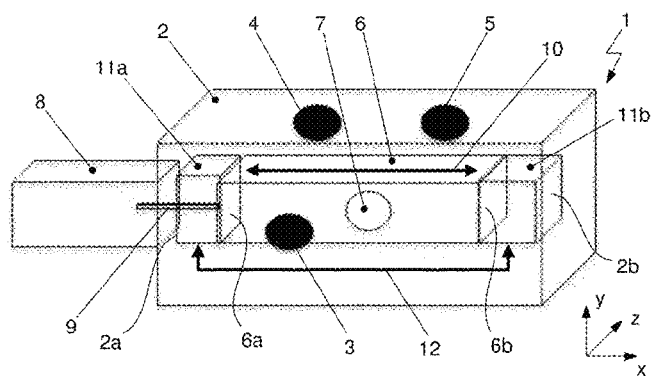
FIG. 1A: A device, in particular a valve, for controlling a flow and distributing a fluid in at least one fluid circuit, for refrigerant circuits of a thermal system of a motor vehicle, in a schematic representation.
Figure 1B:
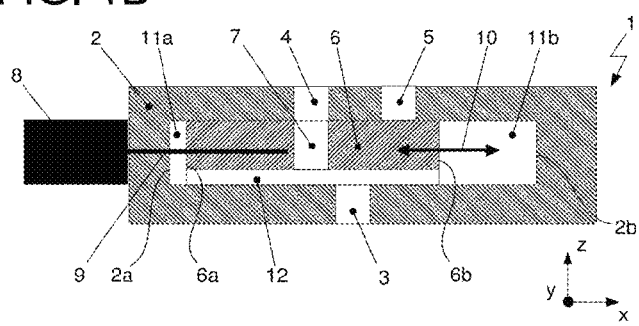
FIGS. 1B to 1D: The device from FIG. 1A in different operating positions, each in a cross-sectional view.
Figure 1C:
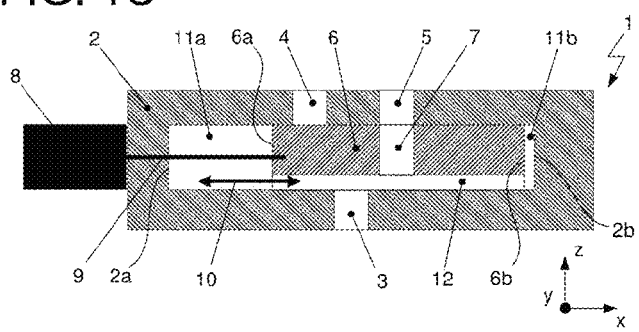
Figure 1D:
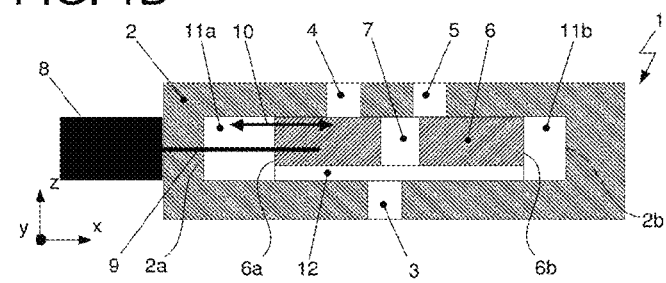

FIG. 1A shows a device 1, in particular a valve, for controlling a flow and distributing a fluid in a fluid circuit, for refrigerant circuits of a thermal system of a motor vehicle, in a schematic representation. FIGS. 1B to 1D show the device 1 from FIG. 1A in different operating positions in a cross-sectional view.

The device 1 is produced as a highly integrated refrigerant valve for performing several functions in order to replace, in particular at least two valves according to the state of the art or to reduce the number of four valves to one component.

The device 1 exhibits a preferably cuboidal housing 2 with one first connection 3 as an inlet for the refrigerant, one second connection 4 as a primary outlet for the refrigerant and one third connection 5 as a secondary outlet for the refrigerant. The connections 3, 4, 5 for refrigerant lines as connecting pipes for connection with other components of the refrigerant circuit are each connected to an internal volume of the housing 2 via pass-through openings. A valve element 6 is arranged inside the volume.

The first connection 3 is arranged on a first lateral surface that is aligned in a plane spanned by the directions x and y, or on a first longitudinal side of the housing 2, whereas the second connection 4 and the third connection 5 are intended on a common second lateral surface that is also aligned in a plane spanned by the directions x and y or a second longitudinal surface of the housing 2, which are arranged opposite the first lateral surface. The symmetry axes of the pass-through openings of the connections 3, 4, 5 are aligned parallel to each other. The diameters of the flow cross-sections of the pass-through openings of the connections 3, 4, 5 of the housing 2 are each constant.

With the exception of the areas of the connections 3, 4, 5, the housing 2 is closed. The outer form of the housing 2 is produced in such a way that the functions, such as also a specific arrangement inside the system, are guaranteed and that cost-efficient series production is possible at minimum component weight.

The for example cylindrical, in particular cuboidal valve element 6 is connected to a drive element 8, also called actuator or actuating element, and arranged outside the housing 2 via a connecting element 9. The longitudinal axes of the valve element 6 and of the connecting element 9 face each other in the x direction and coaxially. The connecting element 9 produced for example as a shaft or as an adjusting stem is on a first end firmly connected to the drive element 8. The connecting element 9 is arranged with the second end that is produced distally towards the first end in such a way that is protrudes on one end face through the wall of the housing 2 into the housing 2, thus being sealed against the housing 2. The drive element 8 is produced for example as an actuator for driving the connecting element 9. The actuator as the electric drive can exhibit a stator with a coil package and an encapsulated rotor with at least one permanent magnet. Consequently, the drive element 8 can be produced either as an encapsulated motor or as a directly driven motor or as a rotary motor or as a linear motor.

If the drive element 8 is produced as a rotary motor, the drive shaft that is intended as a connecting element 9 is set in rotary motion around the longitudinal axis. The rotary motion of the connecting element 9 around its longitudinal axis is transferred into a translatory lifting movement of the valve element 6 in the x direction by way of a transfer arrangement, in particular a thread, specifically a so-called motion thread, which is not shown here and is produced on the connecting element 9 aligned in the axial direction. Thus the translatory lifting movement corresponds to a linear movement of the valve element 6 in the axial direction of movement 10, that is in the direction of the longitudinal axis of the connecting element 9 or of the valve element 6, which runs in the direction of the longitudinal axis of the device 1 through an end face 2a of the housing 2 and an end face 6a of the valve element 6.

The thread pair of the transfer arrangement is intended between the connecting element 9 and the valve element 6, wherein the connecting element 9 that exhibits essentially the form of a cylindrical bar, in particular a round bar, is inserted with one free end into an opening produced in the valve element 6. The free end of the connecting element 9 is arranged distally towards an end that is connected to the drive element 8. The connecting element 9 exhibits an external thread on its free end as the first element of the thread pair, whereas an internal thread is produced as the second element of the thread pair inside the opening of the valve element 6.

The valve element 6 that is moved linearly in the axial direction of movement 10 is held by way of the outer form of the cuboidal valve element 6 that extends essentially in the axial direction and corresponds to the form of the internal volume of the housing 2, thus preventing a rotary movement around the axial direction or longitudinal axis of the valve element 6. The linear movement in the axial direction is permitted. The valve element 6 is moved around the longitudinal axis in the linear movement in the direction of movement 10 by way of the rotational movement of the drive element 8 without its own rotation.

Alternatively, the transfer arrangement that is produced in particular as a thread, could also be intended inside the motor so that the connecting element 9 in combination with the valve element 6 is shifted by way of the translatory lifting movement.

The first connection 3 as the inlet for the refrigerant is connected either to the second connection 4 as the first outlet for the refrigerant as shown in FIG. 1B, or to the third connection 5 as the second outlet for the refrigerant as shown in FIG. 1C by moving the valve element 6 that is fitted with a pass-through opening 7 linearly in a direction of movement 10.

The lateral surfaces and end faces 6a, 6b of the valve element 6 which are each arranged opposite one another are aligned parallel to each other and each aligned parallel to the lateral surfaces and end faces 2a, 2b of the housing 2 that produces the internal volume, which are also arranged opposite one another, as well also aligned parallel to the outer lateral surfaces and end faces of the housing 2, which are also arranged opposite one another. The lateral surfaces of the valve element 6 and of the housing 2 that produces the internal volume are in contact with each other, leaving a slot for moving the valve element 6 relative to the housing 2 inside the internal volume of the housing 2. Consequently, the cross-section of the internal volume of the housing 2 vertically to the longitudinal axis of the device 1 in which the valve element 6 is arranged, and the corresponding cross-section of the valve element 6 plus the slot as the clearance for moving the valve element 6 relative to the housing 2 are equal in form and dimensions. The internal volume of the housing 2 and the form of the valve element 6 differ essentially in their extensions in the longitudinal direction.

One first pressure chamber 11a is intended between the first end faces 2a, 6a of the housing 2 that produces the internal volume, which face each other, and between the second end faces 2b, 6b of the housing 2 that produces the internal volume, which face each other, and of the valve element 6, and one second pressure chamber 11b is intended as a free and variable volume for accommodation of refrigerant. Furthermore, the pressure chambers 11a, 11b are bordered by lateral surfaces of the housing 2 that produces the internal volume.

The total of the volumes of the pressure chambers 11a, 11b is constant. The volumes of the pressure chambers 11a, 11b are modified by the linear movement of the valve element 6 in the direction of movement 10. The pressure chambers 11a, 11b are connected, on the one hand, to the pass-through opening of the first connection 3 of the housing 2 and, on the other hand, to one another fluidically via a connection channel 12 in such a way that the refrigerant that pressurizes the chambers 11a, 11b flows between the pressure chambers 11a, 11b, depending on the direction of movement 10 of the valve element 6, wherein the connection channel 12 can also be produced for example as a flattened section or chamfer on one side of the valve element 6 inside the valve element or inside the walls, in particular a lateral wall of the housing 2, extending between the end faces 6a, 6b, as shown in FIGS. 1B to 1D.

The pass-through opening 7 of the valve element 6 extends through the valve element 6 from a first lateral surface or a first longitudinal side of the valve element 6 to a second lateral surface or a second longitudinal side of the valve element 6. The inlet of the pass-through opening 7 is intended on the longitudinal side of the valve element 6 which on the lateral surface of the wall of the housing 2 is in contact with the first connection 3, whereas the outlet of the pass-through opening 7 is intended on the longitudinal side of the valve element 6 which on the lateral surface of the wall of the housing 2 is in contact with the second connection 4 and the third connection 5, wherein the inlet of the pass-through opening 7 of the valve element 6 is produced in such a way that it corresponds with the pass-through opening of the first connection 3 of the housing 2, and the outlet of the pass-through opening 7 of the valve element 6 with the pass-through opening of the second connection 4 and the third connection 5 of the housing 2. The diameters of the circular flow cross-sections of the pass-through openings of the connections 3, 4, 5, which correspond with each other, and of the pass-through opening 7 of the valve element 6 are equal. The diameter of the flow cross-section of the pass-through opening 7 of the valve element 6 is essentially constant.

The pass-through opening 7 of the valve element 6 is aligned in such a way that the pass-through opening 7 is in line with the pass-through openings of the second connection 4, depending on the operating position of the device 1, as shown in FIG. 1B, or of the third connection 5, as shown in FIG. 1D.

The pass-through opening of the first connection 3 is produced centrally in the x direction between the pass-through openings of the second connection 4 and the third connection 5. The symmetry axes of the pass-through openings of the connections 3, 4, 5, which run parallel to each other, are arranged in a common plane spanned by the x and z directions.

The valve element 6 with the pass-through opening 7 and the connections 3, 4, 5, as well as with the corresponding pass-through openings is arranged moveably inside the housing 2 in such a way that the flow openings for the refrigerant are either blocked or released partially or completely. In addition, the valve element 6 is sealed against the housing 2 fluid-tightly in order to provide for passages specifically for the refrigerant. The manufacturing tolerances of the housing 2 and of the valve element 6 are selected such that the refrigerant can flow only through the connections 3, 4, 5 of the housing 2 with the corresponding pass-through openings, and through the pass-through opening 7 of the valve element 6, thus avoiding undesired bypass flows between the surface of the valve element 6 and the housing 2.

The geometry of the pass-through opening 7 of the valve element 6, in particular that of the flow cross-section of the end that faces the connection 4, 5 of the housing 2, which is produced as the outlet for the refrigerant and is also called outlet level of the pass-through opening 7, is produced in such a way that it deviates from the circular form in many points to be able to guarantee the functionality of expansion of the refrigerant when flowing out of the housing 2 of the device 1.

Figure 1E:
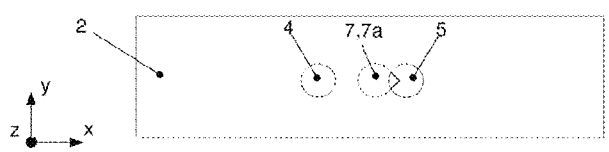
FIG. 1E: The device from FIG. 1A in the operating position according to FIG. 1D in a top view.

FIG. 1D shows the device 1 from FIG. 1A in an operating position with the function of expansion of the refrigerant flowing into the device 1 through the connection 3 and flowing out from the device 1 through the connection 5 in a cross-sectional view, whereas FIG. 1E shows the device 1 from FIG. 1A in the operating position according to FIG. 1D in a top view. Merely a partial area of the maximum possible flow cross-section is opened for expansion of the refrigerant. The connection 4 is closed.

Figure 2A:
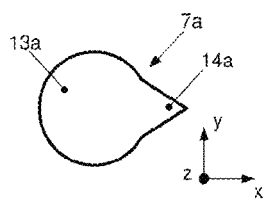
FIGS. 2A to 2B: The flow cross-sections of a pass-through opening of a valve element with a groove.
Figure 2B:
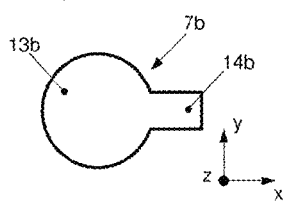

FIGS. 2A and 2B show a flow cross-section 13a, 13b with a pass-through opening 7a, 7b of the valve element 6 with a groove 14a, 14b that is also called expansion notch or control notch, on the outlet level of the pass-through opening 7a, 7b. The groove 14a, 14b is arranged on the margin of the pass-through opening 7a, 7b of the valve element 6.

The flow cross-section 13a of the groove 14a of the pass-through opening 7a according to FIG. 2A is tapered with increasing distance from the center of the pass-through opening 7a, that is in the x direction, and consequently exhibits the form of a triangle, in particular of an isosceles, specifically an equilateral triangle. Thus the end of the flow cross-section 13a of the pass-through opening 7a, which faces the connection 4, 5 of the housing 2, exhibits the form of a circle with an extension similar to a V-notch or control drop.

The flow cross-section 13b of the groove 14b of the pass-through opening 7b according to FIG. 2B is produced with constant width in the x direction and consequently exhibits the form similar to a rectangle. Thus the end of the flow cross-section 13b of the pass-through opening 7b, which faces the connection 4, 5 of the housing 2, exhibits the form of a circle with a rectangular extension.

In the longitudinal direction of the pass-through opening 7a, 7b, which corresponds to the z direction, the flow cross-section 13a, 13b of the pass-through opening 7a, 7b is either constant up to a specified depth in the z direction inside the valve element 6, and the grooves 14a, 14b each exhibit a constant extension in the x direction, or the flow cross-section 13a, 13b of the pass-through opening 7a, 7b is tapered from the symmetry axis of the pass-through opening 7a, 7b and continuously decreases up to the specified depth in the z direction inside the valve element 6 with increasing distance from the end facing the connection 4, 5 of the housing 2, which is produced as the outlet for the refrigerant, that is of the outlet level of the pass-through opening 7a, 7b. Thus the groove 14a, 14b exhibits either a constant extension in the x direction or an extension that decreases, in particular continuously decreases with increasing distance from the outlet level of the pass-through opening 7a, 7b.

Alternatively, the groove 14a, 14b can also be produced over the whole length of the pass-through opening 7, which is in particular also shown in FIG. 1D.

The function of expansion of the refrigerant is adjusted by way of the arrangement of the valve element 6 inside the housing 2, in particular by way of the relative arrangement of the flow cross-section of the pass-through opening of a connection 4, 5, that is produced as an outlet, and of the flow cross-section 13a, 13b of the pass-through opening 7a, 7b of the valve element 6, wherein the valve element 6 is moved and arranged in such a way that the flow cross-section 13a, 13b of the pass-through opening 7a, 7b of the valve element 6, and the flow cross-section of one of the connections 4, 5 overlap merely in the area of the groove 14a, 14b. The flow cross-section for the refrigerant through the device 1 can be increased or reduced by moving the valve element 6 in the direction of movement 10 in order to control the expansion function.

Figure 3A:
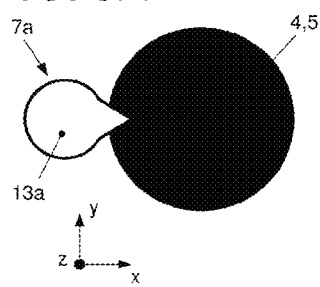
FIGS. 3A and 3B: The appropriate flow cross-section of the pass-through opening of the valve element with groove from the FIGS. 2A and 2B in conjunction with a pass-through opening of a connection of the housing, in particular of an outlet for the fluid.
Figure 3B:
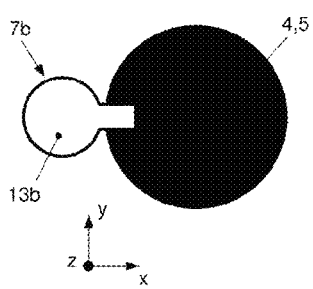

FIGS. 3A and 3B show the corresponding flow cross-section 13a, 13b of the pass-through opening 7a, 7b of the valve element 6 with groove 14a, 14b from the FIGS. 2A and 2B in connection with one of the pass-through openings of a connection 4, 5 of the housing 2, in particular of an outlet for the refrigerant, wherein, in particular FIG. 3A shows a detail view of the arrangement of the pass-through opening 7a of the valve element 6 and of the pass-through opening of the connection 5 from FIG. 1E which is produced as an outlet.

With the passage for the refrigerant through the device 1 being opened completely, the valve element 6 is aligned inside the housing 2 in such a way that the symmetry axes of the pass-through opening of the first connection 3 of the housing 2, of the pass-through opening 7a, 7b of the valve element 6, and the pass-through opening of the second connection 4 according to FIG. 1B, or of the third connection 5 according to FIG. 1C are arranged to one another coaxially or on a common axis, wherein the refrigerant flows into the device 1 through the first connection 3 that is produced as an inlet, is routed via the connection channel 12 to the pass-through opening 7 and flows out of the device 1 through a connection 4, 5 that is produced as an outlet, depending on the operating position of the valve element 6. Consequently, the valve element 6 is produced in such a way that the pass-through opening 7, 7a, 7b is connected to the connection channel 12, producing a common volume.

LIST OF REFERENCE SIGNS

1 Device
2 Housing

2a First end face
2b Second end face
3 First connection, inlet
4 Second connection, first outlet
5 Third connection, second outlet
6 Valve element
6a First end face
6b Second end face
7, 7a, 7b Pass-through opening of valve element 6
8 Drive element of valve element 6
9 Connecting element of valve element 8
10 Direction of movement of valve element 6
11a First pressure chamber
11b Second pressure chamber
12 Connection channel of the pressure chambers 11a, 11b
13a, 13b Flow cross-section
14a, 14b Groove
x, y, z Direction

The invention claimed is:

1. A device for controlling a flow and distributing a fluid, in at least one fluid circuit, comprising a housing fitted with connections for connection to fluid lines that are connected to at least one internal volume of the housing via a pass-through opening of the connections, and at least one valve element that is arranged in the at least one internal volume of the housing and further comprises a drive element for moving the at least one valve element relative to the housing, wherein the at least one valve element further comprises at least one pass-through opening of the at least one valve element and is mounted in such a way that it can be moved linearly in an axial direction along a longitudinal axis such that a passage for the fluid is opened between a first one of the connections, that is produced as an inlet, and a second one of the connections, that is produced as a primary outlet, or a third one of the connections produced as a secondary outlet, and that the device further comprises a first pressure chamber and a second pressure chamber that are each produced on an end face of the at least one valve element, which are both aligned in the axial direction, as an area of the internal volume of the housing, wherein the first pressure chamber and the second pressure chamber are connected to one another fluidically and to the pass-through opening of the first one of the connections of the housing and the first pressure chamber and the second pressure chamber are connected to one another fluidically via a connection channel, and wherein the at least one pass-through opening of the at least one valve element and the connection channel are produced in such a way that they are connected to one another fluidically.

2. The device according to claim 1, wherein the at least one valve element is produced in a form of a cylinder aligned in the axial direction.

3. The device according to claim 1, wherein lateral surfaces of the at least one valve element and of the housing producing the at least one internal volume are arranged parallel to each other, wherein one slot each is produced between the lateral surfaces for moving the at least one valve element relative to the housing inside the at least one internal volume of the housing.

4. The device according to claim 1, wherein the end face of each of the first pressure chamber and the second pressure chamber and end faces of the housing producing the at least one internal volume are arranged in such a way that they face each other, wherein the first pressure chamber is produced between a first one of end face of each of the first pressure chamber and the second pressure chamber and the housing and the second pressure chamber between a second one of the end face of each of the first pressure chamber and the second pressure chamber and the housing.

5. The device according to claim 1, wherein the connection channel is produced inside a wall of the housing or inside the at least one valve element extending between the end face of each of the first pressure chamber and the second pressure chamber.

6. The device according to claim 1, wherein the first one of the connections is produced on a first lateral surface of the housing, and the second one of the connections and the third one of the connections on a second lateral surface of the housing, wherein the second lateral surface is arranged opposite the first lateral surface.

7. The device according to claim 1, wherein symmetry axes of the pass-through opening of the connections for connection to fluid lines are aligned parallel to each other.

8. The device according to claim 1, wherein flow cross-sections of the pass-through opening of the connections for connection to fluid lines of the housing exhibit a circular form, wherein diameters of the flow cross-sections of the pass-through opening of the connections are equal.

9. The device according to claim 8, wherein the pass-through openings of the connections for connection to fluid lines exhibit equal diameters.

10. The device according to claim 1, wherein the at least one pass-through opening of the at least one valve element is produced in such a way that it extends from a first lateral surface of the at least one valve element to a second lateral surface of the at least one valve element through the at least one valve element, wherein the second lateral surface is arranged opposite the first lateral surface, and the first lateral surface is aligned in a direction of the first one of the connections of the housing, and the second lateral surface in a direction of the second one of the connections and the third one of the connections of the housing.

11. The device according to claim 1, wherein a flow cross-section of the at least one pass-through opening of the at least one valve element exhibits an essentially circular form, wherein a diameter of the flow cross-section is constant.

12. The device according to claim 1, wherein the at least one valve element with the at least one pass-through opening of the at least one valve element is produced in such a way that the fluid can be expanded when flowing out of the at least one pass-through opening of the at least one valve element, depending on a position of the at least one valve element.

13. The device according to claim 12, wherein at least one groove is produced on a surface of the at least one valve element, starting from a margin of the at least one pass-through opening of the at least one valve element, which extends in a radial direction to an outside.

14. The device according to claim 13, wherein a flow cross-section of the at least one groove of the at least one pass-through opening of the at least one valve element is produced in such a way that it is tapered outwardly in the radial direction.

15. The device according to claim 13, a flow cross-section of the at least one groove of the at least one pass-through opening of the at least one valve element is produced in the radial direction to the outside with a constant width.

16. The device according to claim 1, wherein the at least one valve element is connected to the drive element arranged outside the housing by way of a connecting element.

17. The device according to claim 16, wherein the connecting element is produced as a shaft.

18. The device according to claim 16, wherein the connecting element is arranged in such a way that a first end is firmly connected to the drive element and a second end, that is produced distally towards the first end, protrudes through one side into the housing and is connected to the at least one valve element.

19. The device according to claim 16, wherein the drive element is produced as an actuator.

20. A use of the device according to claim 1 for controlling the flow and distributing the fluid in a refrigerant circuit of a thermal system.

* * * * *